Oct. 19, 1954   A. B. JORDAN   2,691,831
READING RATE TRAINING AND COMPREHENSION MEASUREMENT
Filed March 4, 1950   2 Sheets-Sheet 1
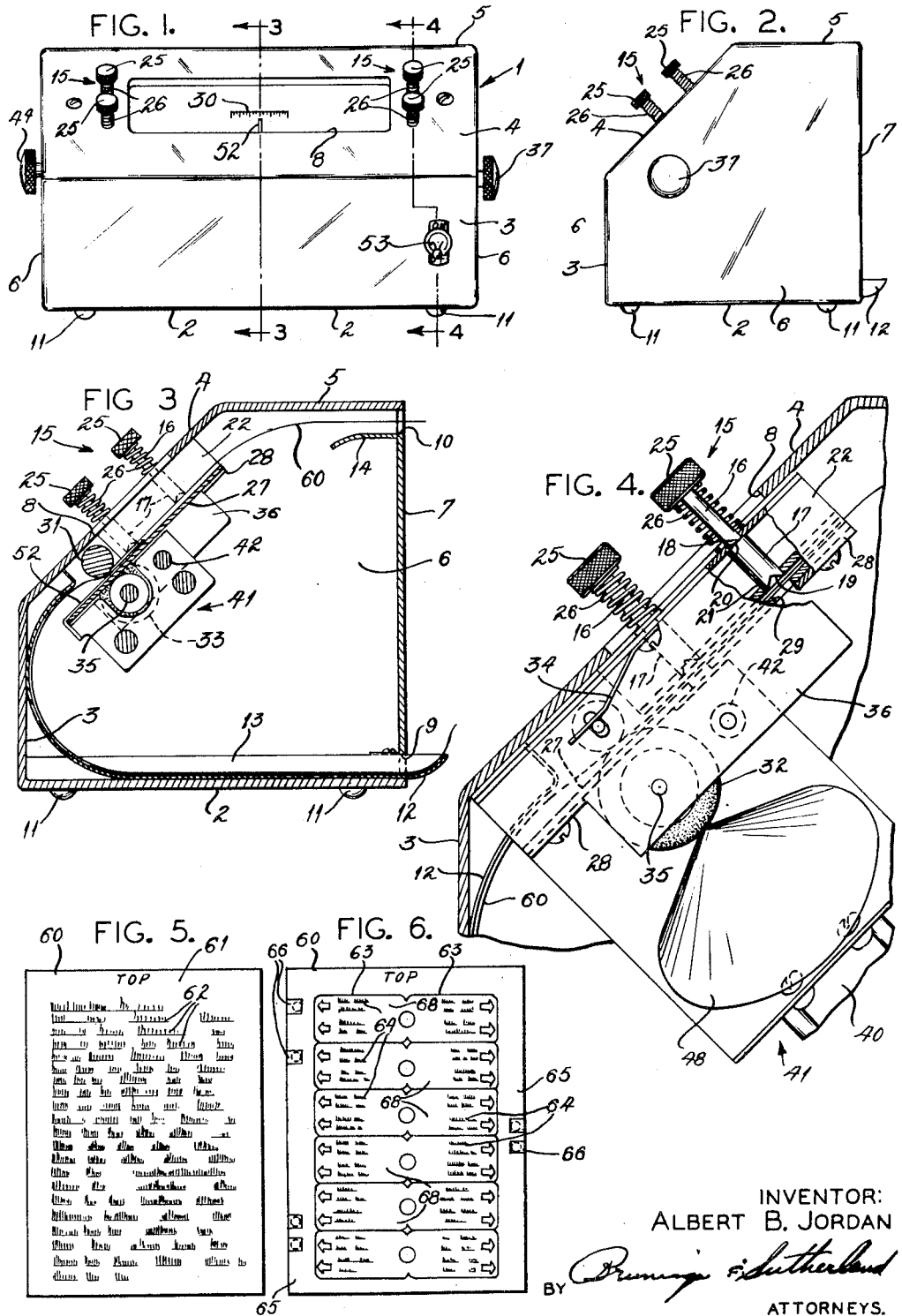
INVENTOR:
ALBERT B. JORDAN
BY
ATTORNEYS.

Oct. 19, 1954 — A. B. JORDAN — 2,691,831
READING RATE TRAINING AND COMPREHENSION MEASUREMENT
Filed March 4, 1950 — 2 Sheets-Sheet 2

INVENTOR:
ALBERT B. JORDAN
BY
ATTORNEYS.

Patented Oct. 19, 1954

UNITED STATES PATENT OFFICE 2,691,831

2,691,831

READING RATE TRAINING AND COMPREHENSION MEASUREMENT

Albert B. Jordan, St. Louis, Mo.

Application March 4, 1950, Serial No. 147,701

5 Claims. (Cl. 35—35)

This invention relates to reading rate training and comprehension measurement. The development of the ability of persons to read rapidly, and to grasp what has been read, is recognized as one of the most important functions of education. Devices have been proposed heretofore for increasing reading rate, but each has had some disadvantage, and none has provided within itself means for testing comprehension. Effective reading must be determined in terms of both speed and comprehension.

One of the objects of this invention is to provide improved means for developing higher effective reading rates. Another object is to provide means for training for higher reading rates and means for comprehension measurement in one simple, compact unit, utilizing a single form for both training and measurement. Other objects will become apparent to those skilled in the art when the following description is read in connection with the accompanying drawings.

In accordance with an illustrative embodiment of this invention, a machine is provided containing means for conveying a form past a viewing aperture automatically at a predeterminable rate which may be varied. The speed at which the reading material of the form is conveyed past the machine's viewing aperture determines the reading rate. The same conveying means are utilized for conveying the form manually for positioning the form within the viewing aperture. In cooperation with the conveying means are means for selectively marking the form while it is positioned within the viewing aperture.

The form comprises a sheet having a series of different areas, and means within one of the areas for allowing mechanical grading. The areas into which the form is divided are: an area in which reading material is printed, an area in which test material is printed, and an area, concealed from the view of the testee during the testing operation, which is engaged by the marking means selectively manipulated by the testee to indicate what he conceives to be the proper answer.

The area engaged by the marking means is provided with scoring means, as for example printed squares, by which the proper position of a mark indicating the correct answer is designated. When the form marked by the testee is withdrawn from the machine, the test may be scored mechanically, either in the sense of simply comparing the position indicated by the scoring means with the marks made by the testee, without reading question or answer, or literally, by one of the classifying devices well known in the classifying art.

Thus, the same machine and form is utilized to provide a means for training to increase reading rate and to provide means for testing comprehension.

Referring to the drawings:

Figure 1 is a view in front elevation of one embodiment of this invention;

Figure 2 is a view in side elevation of the device shown in Figure 1;

Figure 3 is a sectional view taken along the line 3—3 of Figure 1;

Figure 4 is a sectional view taken along the line 4—4 of Figure 1;

Figure 5 is a view of a form, showing the area in which reading material is printed;

Figure 6 is a view of the reverse side of the form shown in Figure 5, showing test and scoring areas;

Figure 7:
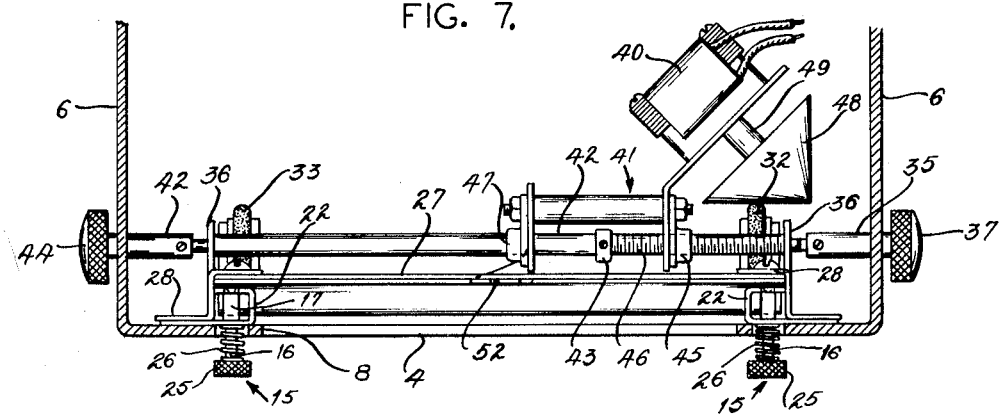
Figure 7 is a plan view, with the cabinet cut away, showing conveying means and variable speed drive therefor.
Figure 8:
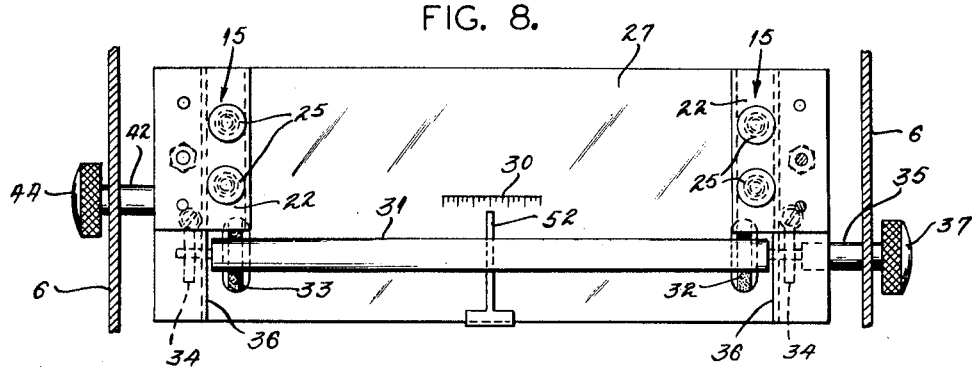
Figure 8 is a view in front elevation, with the cabinet cut away, of the conveying means shown in Figure 7, showing a rate indicator.

In accordance with an embodiment of this invention, an apparatus is provided for testing an examinee's comprehension of subject-matter. The apparatus comprises, a casing provided with a viewing aperture of a width sufficient to expose writing on one side of a sheet, and on the other side of the sheet, the questions relation to the writing, which side has a margin or margins. The sheet is supported with a margin or margins disposed laterally of the questions on the sheet. The sheet is moved with respect to the aperture at a varying rate of movement to vary the timing of the writing past the aperture. Manipulative means is provided to mark the margin or margins of the sheet opposite the questions thereon; and in accordance with this embodiment, the manipulative means comprises manipulative elements arranged in series on and along one or both margins to mark the margin or margins of the sheet opposite the questions thereon.

In the illustrative embodiment of this invention shown in the drawings, I represents a machine of the character described. The cabinet with which the machine is provided comprises a bottom 2, a front panel 3, a sloping face 4, a top 5, sides 6, and a back 7. The sloping face 4 is provided with a viewing aperture 8 of a width sufficient to expose on a sheet the subject-matter to be comprehended or read and also to alternately expose the questions on such subject-matter. The back 7 which, in the embodiment shown, is removable, is provided with a lower slot 9 and an upper slot 10. The bottom 2 may be equipped with feet 11. A lower feed guide 12 is secured interiorly of the cabinet. Also secured within the cabinet are edge guides 13. An upper feed guide 14 may be provided. It can be seen that many of the components of the cabinet may be formed integrally, or that the cabinet may assume other configurations, to perform the same functions.

An embodiment of marking means is shown in detail in Figure 4. In the embodiment shown, marking means 15 comprise a shank 16, having an enlarged section 17, forming a shoulder 18. The lower end of the enlarged portion 17 of the shank 16 is provided with a cutting surface 19 to act as a punch. Bearing surfaces for the shank 16 are provided by an upper hole 20 and a lower hole 21 in a marker bracket 22, within which the shank 16 slides. The construction of marker bracket 22 is clearly shown in Figure 7. A cap 25 is threadedly or otherwise removably secured to the outer end of shank 16. A spring 26, positioned around shank 16, serves to bias the shank outwardly.

Figure 9:
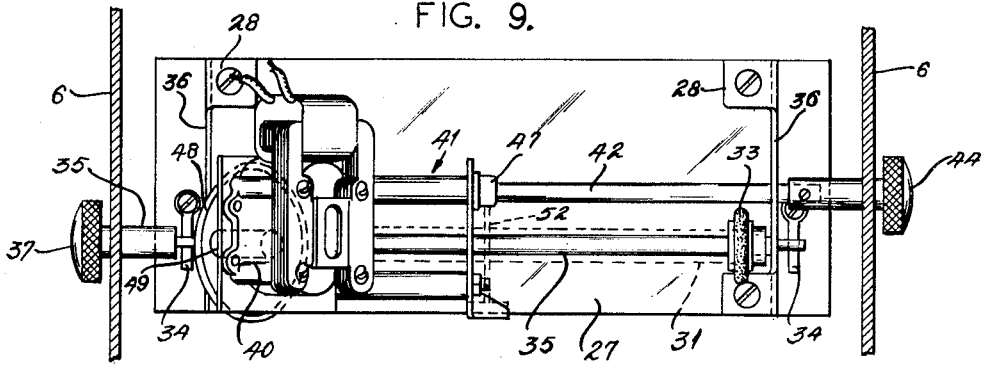
Figure 9 is a back view, with the cabinet cut away, of the embodiment of conveying means with variable drive shown in Figure 7.

In the embodiment shown, means for supporting the sheet is in the form of a plate 27, secured to the sloping face 4 of the cabinet by means of brackets 36 having face plate-holding ears 28, as shown in Figures 7 and 9, serves also as a punch plate. Face plate punch holes 29 are aligned so as to receive cutting surfaces 19. In the embodiment shown, face plate 27 also carries reading rate indicator 30.

The sheet feeding means shown in Figures 3–9 comprise a roller 31, urged into engagement with resilient drive wheels 32 and 33 by springs 34 secured to bracket 28. The plate 27 and the roller support the sheet to alternately expose the subject-matter to be comprehended and the questions on such subject-matter. Resilient drive wheels 32 and 33 are secured to a shaft 35, supported by brackets 36. Shaft 35 is provided with a knurled knob 37, projecting exteriorly of the cabinet, whereby the sheet may be selectively fed.

A variable speed drive for the feeding means in the embodiment shown comprises a motor 40 secured to a motor bracket 41, suspended freely from a motor bracket shaft 42. Motor bracket shaft 42 is threaded through a portion 46 of its length, and is provided with a stop 43. Motor bracket shaft 42 is also supported between brackets 36, and is provided with a knurled adjusting knob 44, which projects exteriorly of the cabinet. Motor bracket 41 is provided with an internally threaded member 45, which engages the threaded section 46 of motor bracket shaft 42. Motor bracket 41 is also provided with a bearing member 47, which slides freely upon the unthreaded section of motor bracket shaft 42. A cone 48, mounted on motor shaft 49, is urged into engagement with resilient drive wheel 32 entirely by the force of gravity. This is accomplished by the proper positioning of the motor bracket 41 with respect to resilient drive wheel 32. Rate indicator pointer 52 is connected to motor bracket 41, and projects exteriorly of face plate 27 under reading rate indicator 30. Motor switch 53, shown in Figure 1, serves to turn motor 40 on and off whereby the sheet may be selectively fed.

In the embodiment of form shown in Figures 5 and 6, a sheet 60 is provided on one side with an area 61, in which reading matter indicated at 62 is printed. On the reverse side of sheet 60, two separate areas are provided. One area 63 contains test questions, indicated at 64. The other area 65 is so situated as to be concealed from view when the sheet 60 is positioned within viewing aperture 8. In the area 65 scoring means 66, which in the embodiment shown are printed squares, are provided. In the embodiment shown in Figure 6, area 63 is divided into discrete sub-areas 68, each containing four test questions 64. Each sub-area 68 is of a size to fit within the aperture 8.

In operation, with the embodiment of machine and form shown in the drawings, reading rate training and comprehension testing are carried out in two steps. In the first, the end of sheet 60 marked "top," with the area 61 on one face Fig. 5 and on which reading matter 62 is printed facing downwardly, is introduced through lower slot 9. Motor 40 is not running. The sheet, guided by lower feed guide 12, is pushed manually until its leading edge contacts roller 31 and resilient drive wheels 32 and 33. Knurled knob 37 is then turned so that the sheet 60 is engaged between resilient drive wheels 32 and 33 and roller 31. Sheet 60 is now positioned to slide over the face plate 27, with its side edges between face plate 27 and marker brackets 22. The sheet now appears in the aperture 8, with the written matter 62 visible in the aperture. Motor switch 53 is then moved to its "on" position, and the reading material 64 is conveyed past aperture 8 at a rate which has been predetermined as is hereafter described.

The leading edge of sheet 60 emerges from upper slot 10. When the trailing edge of sheet 60 passes roller 31 and resilient drive wheels 32 and 33, motor 40 is turned off, and the sheet is removed through upper slot 10.

Variations in reading rate are produced by simply turning knurled adjusting knob 44, which turns motor bracket shaft 42. Threaded section 46, engaging threaded member 45 of motor bracket 41, shifts motor bracket 41 transversely with respect to resilient drive wheel 32. When motor bracket 41 is shifted away from resilient drive wheel 32, so that cone member 48 engages resilient drive wheel 32 near its apex, the rate of rotation of resilient drive wheel 32, and therefore of shaft 34 and resilient drive wheel 33, approaches zero. When motor bracket 41 is shifted toward resilient drive wheel 32, so that cone 48 engages resilient drive wheel 32 toward its base, the speed of rotation of resilient drive wheel 32 is increased. By properly proportioning the diameters of cone 48 and resilient drive wheel 32, the desired range of reading rates may be obtained. This range is calibrated and indicated upon the face of face plate 27 as reading rate indicator 30. The rate indicator pointer 52, connected to motor bracket 41, while simply indicating the position of motor bracket 41, gives an accurate indication of the reading rate for that particular position, since there is a direct correlation between the position of the motor bracket 41 and the rate of rotation of resilient drive wheel 32.

For the comprehension testing step, the sheet 60 is re-inserted within lower slot 9 with the edge marked "top" as the leading edge, and with the areas 63 and 65 Fig. 6 on the reverse side of the sheet facing downwardly. The leading edge of sheet 60 is again engaged between roller 31 and resilient drive wheels 32 and 33, by means of knurled knob 37. The reading matter on the reverse side of the sheet now appears in the aperture 8. However, during this operation the motor 50 remains idle, and sub-areas 68 are consecutively positioned within aperture 8 by means of knurling knob 37.

While each of sub-areas 68 are successively positioned within aperture 8, the particular cap 25 of the marking means 15 positioned to indicate what the testee thinks to be the proper answer is depressed against the bias of spring 26 and the resistance of the material of which the sheet 60 is formed to punch a hole within the area 65, which is concealed from view between marker bracket 22 and face plate 27. When all of sub-areas 68 of test area 63 have been successively positioned within the aperture 8, and the scoring area 65 corresponding to each sub-area has been marked with marking means 15, the sheet 60 is again withdrawn through the upper slot 10. By comparing the position of the holes left by marking means 15 with the positions of scoring means 66, scoring may be accomplished at a glance, without reading either questions or answers. It is clear that the punched forms may be fed through one of the classifying machines well known to the art, to accomplish the scoring automatically.

The manner of statement of questions within the test area of the form may be varied. In the embodiment illustrated, a four-question multiple choice type is indicated. An illustrative example, in questions relating to reading matter which concerns the digging of potatoes, and appearing on the reverse side, Fig. 6, of the sheet is:

| THE POTATOES WERE DUG WITH THE HANDS | THE POTATOES WERE DUG WITH A HOE |
| THE POTATOES WERE DUG WITH A MACHINE | THE POTATOES WERE DUG WITH A PLOW |

The reader actuates the proper cap 25 of marking means 15, to punch a hole in the margin 65 of the sheet. There are in this case four caps corresponding to the four questions and the actuation of the chosen cap marks the margin at the question selected. It can be seen that true and false questions may also be used, and variations thereon, as in selecting which of a group of questions is false.

Thus it can be seen that a simple, effective reading rate trainer and comprehension measuring device is provided, requiring only a single form to accomplish both objects.

Having thus described the invention, what is claimed and desired to be secured by Letters Patent is:

1. An apparatus for testing an examinee's comprehension of subject-matter, comprising, a casing provided with a viewing aperture of a width sufficient to expose such subject-matter and questions on such subject-matter on an examination sheet, means for supporting such a sheet to so expose such subject-matter and also to alternately expose such questions on the sheet with a margin thereof disposed laterally of the questions on the sheet, means for moving the sheet with respect to said aperture to alternately effect such exposures, means for varying the rate of movement of the sheet during exposure of such subject-matter, and manipulative means positioned to mark the margin of the sheet opposite the questions thereon when so exposed.

2. An apparatus for testing an examinee's comprehension of subject-matter, comprising, a casing provided with a viewing aperture of a width sufficient to expose such subject-matter and questions on such subject-matter on an examination sheet, means for supporting such a sheet to so expose such subject-matter and also to alternately expose such questions on the sheet with a margin thereof disposed laterally of the questions on the sheet, means for moving the sheet with respect to said aperture to alternately effect such exposures, means for varying the rate of movement of the sheet during exposure of such subject-matter, and a plurality of manipulative elements positioned in series along and to mark the margin of the sheet opposite the questions thereon when so exposed.

3. An apparatus for testing an examinee's comprehension of subject-matter, comprising, a casing provided with a viewing aperture of a width sufficient to expose such subject-matter and questions on such subject-matter on an examination sheet, means for supporting such a sheet to so expose such subject-matter and also to alternately expose such questions on the sheet with margins thereof disposed laterally of the questions on the sheet, means for moving the sheet with respect to said aperture to alternately effect such exposures, means for varying the rate of movement of the sheet during exposure of such subject-matter, and a plurality of manipulative elements positioned to respectively mark the margins of the sheet opposite the questions thereon when so exposed.

4. An apparatus for testing an examinee's comprehension of subject-matter, comprising, a casing provided with a viewing aperture of a width sufficient to expose such subject-matter and questions on such subject-matter on an examination sheet, means for supporting such a sheet to so expose such subject-matter and also to alternately expose such questions on the sheet with margins thereof disposed laterally of the questions on the sheet, means for moving the sheet with respect to said aperture to alternately effect such exposures, means for varying the rate of movement of the sheet during exposure of such subject-matter, and a plurality of manipulative elements positioned in two series along the respective margins of the sheet to mark the respective margins opposite the questions thereon when so exposed.

5. An apparatus for testing an examinee's comprehension of a writing on one side of a sheet having questions relating thereto on the other side thereof and having a margin, comprising, a casing having an aperture of a width sufficient to expose such writing and such questions, means for supporting such sheet to so expose such subject-matter and also to alternately expose such questions on the sheet, means for moving the sheet with respect to the aperture to alternately effect such exposures, means for varying the rate of movement of the sheet to vary the timing of the writing past said aperture, said moving means operating to move the sheet when reversed with the questions thereon past said aperture to be reviewed by the examinee and manipulative means positioned to mark the margin of the sheet opposite the questions thereon when so exposed.

References Cited in the file of this patent

UNITED STATES PATENTS

| Number | Name | Date |
| --- | --- | --- |
| Re. 20,223 | Taylor | Dec. 29, 1936 |
| 1,869,522 | Stader | Aug. 2, 1932 |
| 1,982,611 | Hartnett | Nov. 27, 1934 |
| 2,030,175 | Le Fevre | Feb. 11, 1936 |
| 2,078,834 | Brennan | Apr. 27, 1937 |
| 2,213,974 | Baker | Sept. 10, 1940 |
| 2,252,726 | Peck | Aug. 19, 1941 |
| 2,274,811 | Sisson | Mar. 3, 1942 |
| 2,311,055 | Kopas | Feb. 16, 1943 |
| 2,401,434 | Mills | June 4, 1946 |
| 2,468,953 | Bennett | May 3, 1949 |
| 2,487,242 | Holland | Nov. 8, 1949 |
| 2,496,767 | Zuercher | Feb. 7, 1950 |

OTHER REFERENCES

"Rhythm Reading," copyright (1935), The American Optical Co.